United States Patent [19]

Källström

[11] Patent Number: 5,485,198
[45] Date of Patent: Jan. 16, 1996

[54] MULTIPLE CHANNEL DECODING DEVICE FOR TV SYSTEMS

[75] Inventor: Ulf Källström, Göteborg, Sweden

[73] Assignee: Sweden On Line AB, Stockholm, Sweden

[21] Appl. No.: 232,095

[22] PCT Filed: Sep. 30, 1992

[86] PCT No.: PCT/SE92/00685

§ 371 Date: Apr. 29, 1994

§ 102(e) Date: Apr. 29, 1994

[87] PCT Pub. No.: WO93/11642

PCT Pub. Date: Jun. 10, 1993

[30] Foreign Application Priority Data

Nov. 26, 1991 [SE] Sweden ................................ 9103493

[51] Int. Cl.⁶ .................................................. H04N 7/167
[52] U.S. Cl. ................ 348/11; 348/7; 348/387; 380/20
[58] Field of Search .................... 348/7, 10, 11, 348/5.5, 726, 465, 401, 385, 387; 455/26.1; 380/20; H04N 7/167

[56] References Cited

U.S. PATENT DOCUMENTS

| | | | |
|---|---|---|---|
| 4,606,072 | 8/1986 | Martin et al. | 348/11 |
| 4,611,242 | 9/1986 | Williams | 380/20 |
| 4,616,256 | 10/1986 | Boutmy | 358/86 |
| 4,688,248 | 8/1987 | Tomizawa | 348/11 |
| 4,792,848 | 12/1988 | Nussrallah et al. | 348/7 |
| 4,918,516 | 4/1990 | Freeman | 348/11 |
| 5,361,096 | 11/1994 | Ohki et al. | 348/387 |

FOREIGN PATENT DOCUMENTS

| | | | |
|---|---|---|---|
| 0265349 | 4/1988 | European Pat. Off. | H04N 7/16 |
| 0564175 | 3/1993 | Japan | 348/387 |

OTHER PUBLICATIONS

Patent Abstracts of Japan, vol. 9, No. 31, E–295, Abstract of JP, A, 59–174079 (Sony K.K.) 2 Oct. 1984.

*Primary Examiner*—James J. Groody
*Assistant Examiner*—Jeffrey S. Murrell
*Attorney, Agent, or Firm*—Dowell & Dowell

[57] ABSTRACT

A decoding device for use in television systems having coded channels includes a tap and decoding blocks arranged in parallel for simultaneously decoding a plurality of channels. The decoding device may include a remote control to enable the remote control of the decoding blocks.

12 Claims, 1 Drawing Sheet

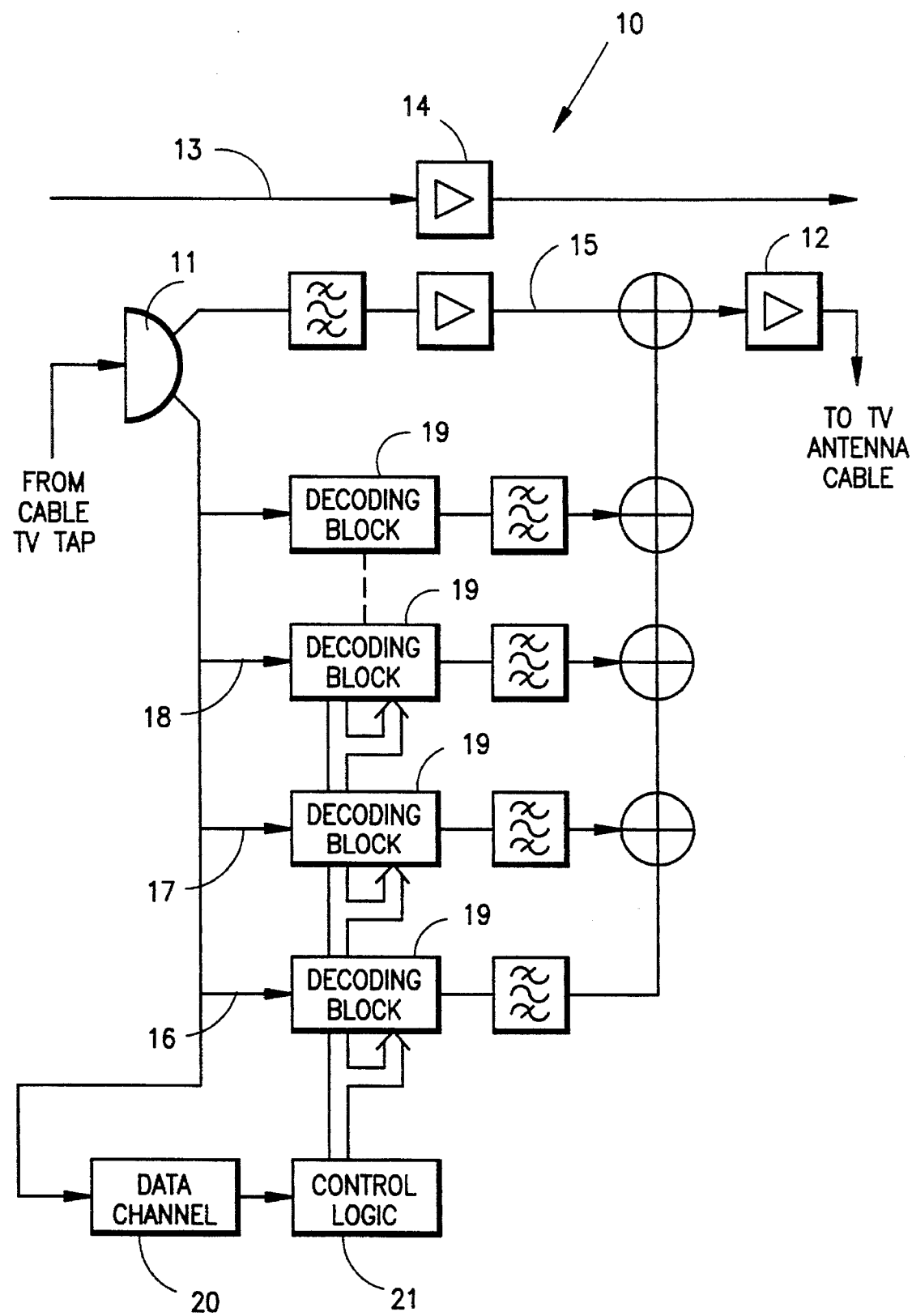

MULTIPLE CHANNEL DECODING DEVICE FOR TV SYSTEMS

BACKGROUND OF THE INVENTION

The present invention relates to a decoding device in TV-systems, and more particularly to TV-systems of the kind where at least some of the channels are so called pay-TV-channels.

As far as it is known all presently existing decoders for TV-systems of the above-mentioned kind require that the respective subscriber first adjusts his TV-apparatus to a desired channel, and then chooses a channel on his decoder. In most cases this is performed by means of remote controller, which is specially designed for this purpose. The result is that the subscriber may have to handle two to three remote controllers, i.e., one remote controller for the decoder, one remote controller for the TV-apparatus and one remote controller for a video set. In case the subscriber also has a CD-player with a remote controller he may feel himself somewhat confused.

Another disadvantage with the decoders as hietherto known for TV-systems of the kind as mentioned above is that they are normally comparatively bulky and have to be placed either on the TV-apparatus or underneath the same, or, of course, somewhere else. Sometimes, they are estethically less attractive, and their outer appearance often breaks with the outer appearance of the TV-apparatus.

Still another disadvantage of the decoders as hietherto known for TV-systems of the kind as mentioned in the above is that they do normally not permit watching the program on one channel while simultaneously recording the program on a different channel.

SUMMARY OF THE INVENTION

The object of the present invention is to provide an improved decoder for TV-systems of the kind where at least some of the channels are so called pay-TV-channels, by means of which the above mentioned drawbacks are remedied.

To the just mentioned end the decoder according to the present invention is characterized essentially in that decoder forms a self-contained unit, which is provided with at least one connection means and at least one tap means between which are coupled a plurality of decoding blocks which are disposed parallel to each other and are adapted to decode several channels simultaneously, wherein each block is adapted to convert up "its" channel to a UHF-channel of its own, and wherein each self-contained decoding unit comprises a data channel and a control logic for remote control of the individual decoding blocks from a central administrative control unit.

According to the invention it is preferred that the self-contained decoding unit also comprises a by-pass for uncoded signals.

Further, it is preferred that the self-contained decoding unit is provided with connecting means and tap means for connection to an ordinary central radio antenna.

BRIEF DESCRIPTION OF THE DRAWING

The invention will be disclosed in more details below with reference had to the accompanying drawing, which diagramatically illustrates one embodiment of a decoder according to the invention.

DETAILED DESCRIPTION OF THE PREFERRED EMBODIMENT

The decoder shown in the drawing and generally denoted 10, is a self-contained unit, which is provided with connecting means 11, not shown in detail, for connection to an existing, ordinary antenna tap, not shown, i.e. a cable-TV-tap (CATV). The self-contained decoder unit 10 is also provided with a tap means 12, not shown in detail, to which the antenna cable of the subscriber's TV-apparatus may be connected.

In the example shown the self-contained decoder unit 10 is further provided with a connecting means 13 for connection to an ordinary central radio antenna tap, not shown, and it is also provided with a tap means 14, not shown in detail, to which an ordinary radio antenna cable may be connected. The connecting means 13 and the tap means 14 form, per se, no part of the present invention for which reason they will not be disclosed in detail here. In fact, it is not even necessary for the invention that the decoder is provided with the connecting means and the tap means, respectively, for the radio antenna connection. It should be mentioned that the connecting means and the tap means, respectively, for the radio antenna connection, if present at all, may serve to stabilize the decoder unit 10 plainly mechanically, when it has been put in place.

The decoder unit comprises a by-pass, generally denoted 15, between the connecting means 11 and the tap means 12 to let through uncoded signals.

Further, the decoder unit 10 comprises a plurality of branches 16, 17, 18 between the connecting means 11 and the tap means 12 to take care of coded signals, whereby each one of the branches 16, 17, 18 comprises a decoder block, such as the decoder block 19, for instance. These decoder blocks are disposed parallel to each other and are adapted to decode the respective channels or branches simultaneously. Each block 19 is adapted to convert up "its" channel to a UHF-channel, which permits the channel choice to take place directly on the TV-apparatus, and, alternatively, on a further TV-apparatus or a video.

The number of decoder blocks may be choosen according to the desire of each particular cable operator, and is conveniently 4–8, for instance. The frequency range of each decoder block is, to a certain extent, dependent on the particular coding system, but a comparatively full covering range is, e.g., 130 MHz–550 MHz.

Each block is adapted to be remote controlled from an existing administrative center within the cable net, via a data channel 20 and through a control logic 21, but may optionally not be controlled by the subscriber.

Each decoder block 19 is individually adjustable to any one of the existing pay channels. Thus, the subscriber needs only to advise the cable operator of which channels he desires, and will have these centrally picked from the administrative center.

Further, for those operators who so desire, it is also possible to obtain a traditional decoder function with remote control, which then operates on one of the decoder blocks.

It should be mentioned that the connection means 11, 13 and the tap means 12, 14, respectively, of course may be omitted at installation of the decoder in houses under production, in which case the connection in stead takes place to the ordinary cables for cable-TV and the ordinary antenna taps, respectively, which should have been installed in the otherwise ordinary way.

We claim:

1. A decoding device for use in television systems, comprising:

first connection means for connecting to a television tap;

first tap means for connecting to an antenna cable of a television;

a plurality of decoding blocks arranged in parallel and being connected to the first connection means and the first tap means, the decoding blocks being adapted to simultaneously decode a plurality of coded television channels and to send an output signal to the first tap means; and a data channel and a control logic connected to the plurality of decoding blocks to enable each decoding block to be remotely controlled.

2. The decoder device of claim 1, further comprising a by-pass first connected to the connection means and the first tap means for uncoded television signals.

3. The decoder device of claim 2, further comprising second connection means and second tap means for connection to a radio antenna.

4. The decoder device of claim 1, further comprising connecting means and tap means for connection to a radio antenna.

5. The decoding device of claim 1, wherein each individual decoding block is capable of decoding a plurality of coded television channels.

6. The decoding device of claim 1, wherein the television tap is a cable television tap.

7. A self-contained decoding device for use in cable television systems, comprising:

connection means for connecting to a cable television tap;

tap means for connecting to an antenna cable of a television;

a by-pass connected to the connection means and the tap means for uncoded signals;

a plurality of decoding blocks arranged in parallel and being connected to the connection means and the tap means, each individual decoding block being capable of converting a plurality of coded television channels to UHF channels and the plurality of decoding blocks being adapted to simultaneously convert a plurality of coded television channels to UHF channels; and means connected to the plurality of decoding blocks for enabling each decoding block to be remotely controlled.

8. A decoding device for use in television systems, comprising:

connection means for connecting to a television tap;

tap means for connecting to an antenna cable of a television;

a by-pass connected to the connection means and the tap means for uncoded signals; and a plurality of decoding blocks arranged in parallel and being connected to the connection means and the tap means, the decoding blocks being adapted to simultaneously decode a plurality of television channels and to send an output signal to the tap means.

9. The decoding device of claim 8, wherein each individual decoding block is capable of decoding a plurality of coded television channels.

10. The decoding device of claim 9, wherein the television tap is a cable television tap and the coded channels are pay channels.

11. The decoding device of claim 10, further comprising means connected to the plurality of decoding blocks to enable each decoding block to be remotely controlled.

12. The decoding device of claim 11, wherein each decoding block converts coded television channels to UHF channels.

* * * * *